(No Model.)
N. P. WALTERS.
CATTLE GUARD FOR RAILWAYS.
No. 511,477. Patented Dec. 26, 1893.
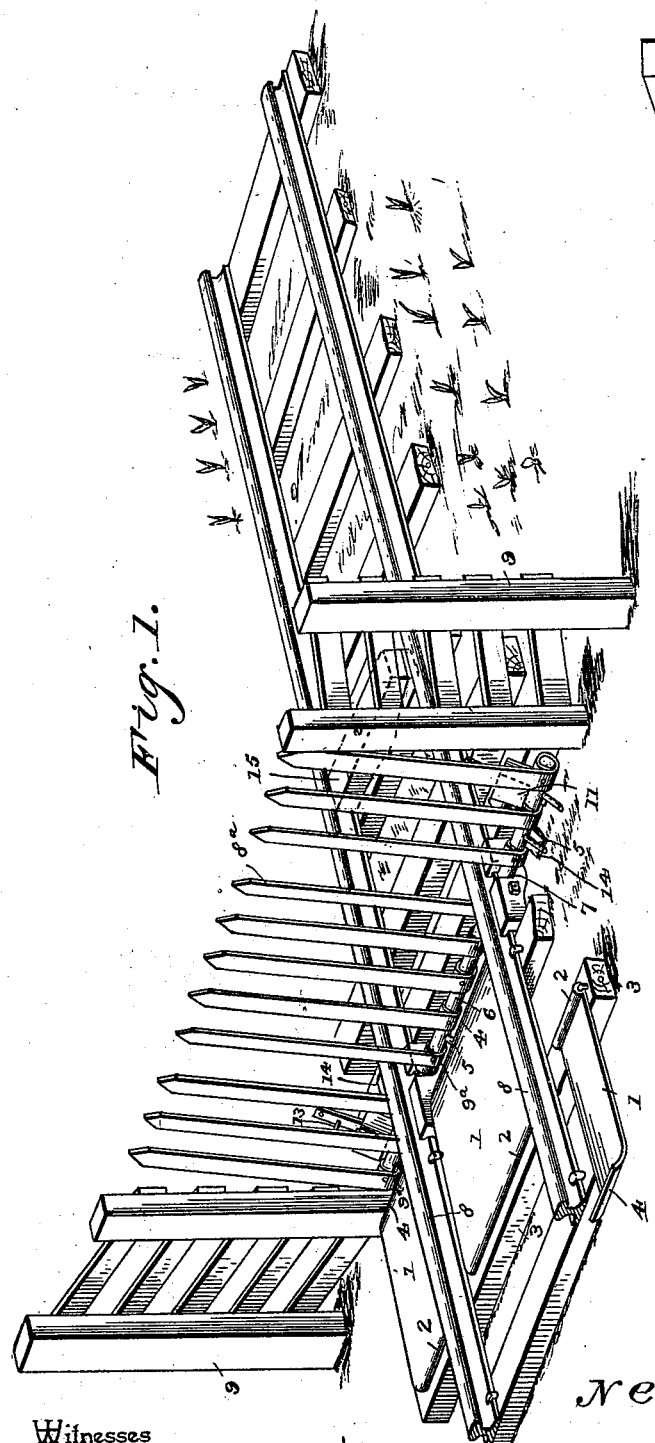
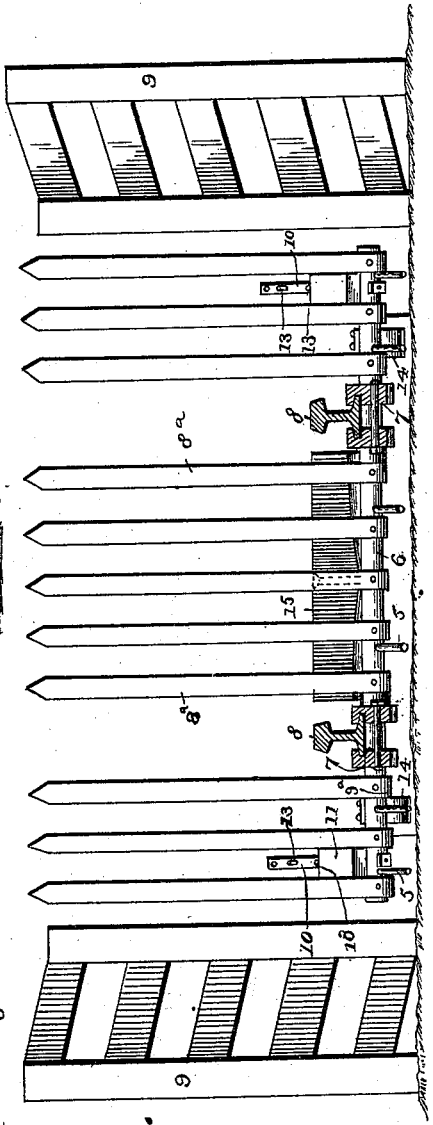
Inventor
Nels P. Walters,
By his Attorneys.
C. A. Snow & Co.
Witnesses

UNITED STATES PATENT OFFICE.

NELS P. WALTERS, OF FORT MADISON, IOWA.

CATTLE-GUARD FOR RAILWAYS.

SPECIFICATION forming part of Letters Patent No. 511,477, dated December 26, 1893.

Application filed September 11, 1893. Serial No. 485,285. (No model.)

*To all whom it may concern:*

Be it known that I, NELS P. WALTERS, a citizen of the United States, residing at Fort Madison, in the county of Lee and State of Iowa, have invented a new and useful Cattle-Guard for Railways, of which the following is a specification.

The invention relates to improvements in cattle guards.

The object of the present invention is to provide a simple and inexpensive cattle guard, which will effectually prevent cattle entering an adjoining field to which ingress is afforded by reason of a railroad traversing them.

The invention consists in the construction and novel combination and arrangement of parts hereinafter fully described, illustrated in the accompanying drawings and pointed out in the claims hereto appended.

In the drawings—Figure 1 is a perspective view of a cattle guard constructed in accordance with this invention, the gate being raised, and one of the platforms being swung back. Fig. 2 is a transverse sectional view.

Like numerals of reference indicate corresponding parts in both figures of the drawings.

1 designates platforms, hinged at their outer ends 2 to a cross-tie 3 and having their inner ends 4 bent downward and resting upon inclined arms 5 of a rock-shaft 6; the rock-shaft is journaled in suitable bearings 7 beneath rails 8; and it has secured to it pickets 8ª, which constitute a gate, and which are adapted to close the space between adjacent fences 9 to prevent cattle passing through the fences and entering adjacent fields. The weight of an animal attempting to pass between the fences 9 depresses the platforms 1 and partially turns the rock-shaft to raise the pickets from a horizontal position to an approximately vertical one.

The pickets, which may be of any desired construction, are preferably constructed of metal and are provided at their inner or lower ends with eyes 9ª to receive the rock-shaft on which they are secured; and they are arranged in series and are located between the rails and at the sides of the track. The rock-shaft is held against longitudinal movement by suitable collars arranged against the inner sides of the bearings 7; and it is provided at its ends with weight arms 10 extending in the general direction of the pickets at a slight angle thereto and located beneath the same and provided with adjustable weights 11. The weights are slidingly mounted on the arms 10 and are secured in their adjustment by pins 13, and they are adapted to counterbalance the cattle guard to enable the same to be operated by small animals. The pickets fall by gravity when the weight on the platform is removed, and they cause the cattle guard to assume automatically its normal position.

In order to prevent the cattle guard from being injured by a heavy weight placed suddenly on the platform, springs 14 are provided, and are arranged beneath two of the arms 5 of the rock-shaft. The springs are secured to the adjacent cross-tie and extend beneath the rock-shaft in a position to be engaged by the adjacent inclined arm of the rock-shaft, when the latter is partially rotated in opening to form a cushioning stop at each side of the track.

The platforms are adapted to be swung back, as illustrated by one of them in Fig. 1 of the accompanying drawings, to afford ready access to the rock-shaft and the adjacent parts for cleaning them or adjusting the weights, or for other purposes.

In order to prevent injury to the gate by reason of a train approaching the points of the pickets and operating the cattle guard by a dragging iron or weight, a pivoted bar 15 is mounted on a cross-tie adjacent to the points of the pickets, and is adapted to be turned by such a dragging weight. The bar 15 is centrally pivoted, and when turned at either side, one of its ends extends over and engages the pickets and prevents the cattle guard from operating.

It will be readily seen that the cattle guard is exceedingly simple and inexpensive in construction and strong and durable, that it is adapted to be readily operated by a light weight, and that it is capable of effectually preventing cattle from entering adjoining fields.

Changes in the form, proportion and the minor details of construction may be resorted to without departing from the principle or sacrificing any of the advantages of this invention.

What I claim is—

1. In a cattle guard, the combination of a rock-shaft provided with arms, pickets secured to the rock-shaft, a depressible platform engaging said arms, and a cushioning spring arranged below one of the arms and adapted to be engaged by the same when the pickets have nearly reached the end of their upward movement, substantially as described.

2. In a cattle guard, the combination of a rock-shaft designed to be arranged transversely of a railroad track and provided with inclined arms 5 and having weight arms, pickets secured to the rock-shaft and arranged in series and designed to be located between the rails and at the sides of the track, platforms hinged at their outer ends and arranged between the rails and at the sides of the track, and having their inner ends extending downward and engaging the inclined arms, adjustable weights mounted on the weight arms, and cushioning springs located below the rock-shaft and arranged to be engaged by arms thereof, substantially as described.

In testimony that I claim the foregoing as my own I have hereto affixed my signature in the presence of two witnesses.

NELS P. WALTERS.

Witnesses:
B. B. HESSE,
STEPHEN SCHIER, Jr.